UNITED STATES PATENT OFFICE.

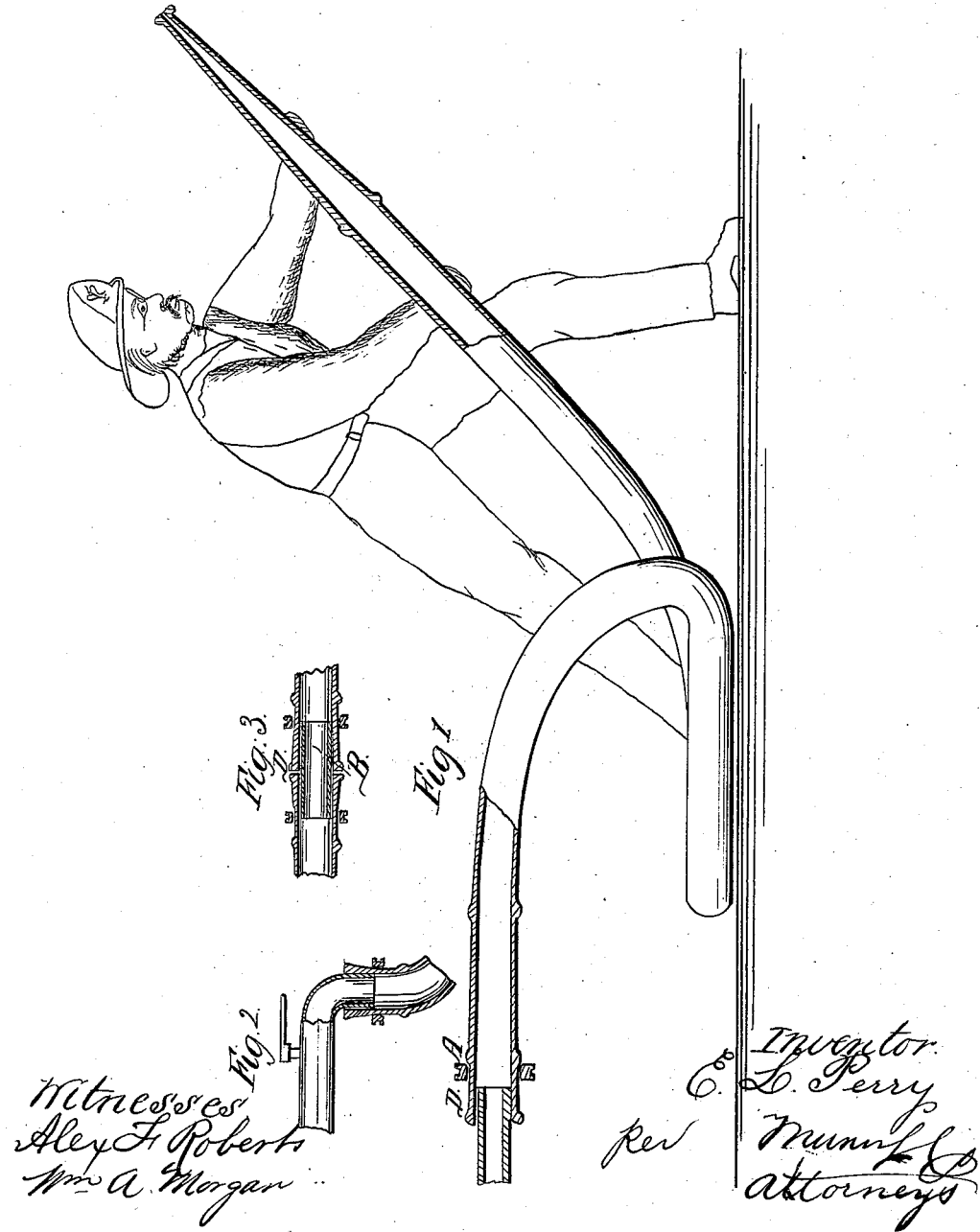

EDWARD L. PERRY, OF NEW YORK, N. Y.

Letters Patent No. 85,395, dated December 29, 1868.

IMPROVEMENT IN HOSE.

The Schedule referred to in these Letters Patent and making part of the same.

*To all whom it may concern:*

Be it known that I, EDWARD L. PERRY, of the city, county, and State of New York, have invented a new and useful Improvement in Hose; and I do hereby declare that the following is a full, clear, and exact description thereof, which will enable others skilled in the art to make and use the same, reference being had to the accompanying drawings, forming a part of this specification.

The object of this invention is to provide hose for fire-engines and other purposes, with means for coupling them together or to the hydrant-plug, and with nozzles, at much less cost than those now in use.

It consists in constructing the ends of rubber hose of the proper size and form internally to be stretched over the ends of metallic coupling-joints or the nozzles of fire-plugs, and providing the said ends externally with rings or other suitable fastenings, which may be forced over the said ends after they have been so stretched on the said parts, and thereby press the yielding material of the hose into the screw-threads or grooves of the said parts, making water-tight joints, the said ends of the hose being tapered to cause the said rings or fastenings to more effectually produce tight joints.

It also consists in constructing the nozzle for the hose in one piece, and of the same material of which the hose is composed.

The leather or rubber hose, as at present constructed and sold in market, requires expensive metal fittings for joining, by screw-threads, to the plugs, or for uniting the several joints together. Also, expensive metallic nozzles, which are also joined to the hose by metallic joints, which require to be made with great exactness, but which frequently leak, although expensively constructed, and which are very liable to be damaged by falling on the pavement, or by being jammed in any manner. The nozzles are also liable to be badly bent and misshaped from falling. They are also troublesome to take care of, as the hose cannot be wound on the hose-reel, and must be unscrewed from the hose and separately provided for.

In the case of hose for washing sidewalks, it is frequently the case that the fittings cost as much as the hose.

In the drawings—

Figure 1 represents a hose-pipe constructed according to my improvement, and provided with a nozzle and the means of joining to a fire-plug;

Figure 2 shows the same method of joining to a faucet; and

Figure 3 shows the method of coupling two joints together.

Similar letters of reference indicate corresponding parts.

In the manufacture of rubber hose, I propose to construct the ends to be joined together, or to a fire-plug or faucet, of standard internal sizes, which will admit of being stretched over the nozzles of the said plugs or faucets, or the coupling-joints, and externally tapering the said ends, is shown in the several figures, and provide them with metallic rings A, or any other similar means, for clamping the ends to the plugs, or the ends may be straight and the rings may be internally tapered, thereby pressing the substance of the said ends into the screw-threads of the plugs, as ordinarily formed, for joining the ordinary screwed metal connections, or into plain grooves with which the said plugs may be provided, or the surfaces may be smooth, if preferred.

For joining sections together, I propose to use a short metallic joint, B, the ends of which may be straight or tapered, and either plain or provided with grooves, and secure the ends of the said sections to it, as before described.

I also propose to form the nozzle of the same material as that of which the hose is composed, and at the same time, whereby a very material saving in expense will be effected.

C, fig. 1, represents a nozzle, so formed in connection with the hose, which being as flexible as the hose, cannot suffer from falling or bruising, as in the case of the metallic nozzles, and which may also be bent in any direction, to give direction to the water.

I propose to provide hose with nozzles, and fitted to be joined on to the plugs, as described, of various lengths and sizes, suitable for all uses, as for washing sidewalks, yards, or for use on fire-engines, whereby I can supply the trade with all desirable lengths.

Having thus described my invention,

What I claim as new, and desire to secure by Letters Patent, is—

1. As a new article of manufacture, a continuous flexible India-rubber hose, terminating in a rigid nozzle of the same material, substantially as described, for the purpose specified.

2. The combination of the exteriorly-tapering end, D, of the hose, with the tube B, having a screw-thread on its exterior, the part D being pressed into the screw-threads B, by means of a ring, A, all substantially as shown and described.

The above specification of my invention signed by me, this 10th day of June, 1868.

EDWARD L. PERRY.

Witnesses:
FRANK BLOCKLEY,
ALEX. F. ROBERTS.